United States Patent
Araki

(10) Patent No.: US 8,321,037 B2
(45) Date of Patent: Nov. 27, 2012

(54) PLC DISTRIBUTED CONTROL SYSTEM

(75) Inventor: Tsutomu Araki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 552 days.

(21) Appl. No.: 12/519,881

(22) PCT Filed: Dec. 14, 2007

(86) PCT No.: PCT/JP2007/074164
§ 371 (c)(1),
(2), (4) Date: Jun. 18, 2009

(87) PCT Pub. No.: WO2008/075631
PCT Pub. Date: Jun. 26, 2008

(65) Prior Publication Data
US 2010/0057220 A1 Mar. 4, 2010

(30) Foreign Application Priority Data

Dec. 18, 2006 (JP) .................................. 2006-339822

(51) Int. Cl.
*G05B 11/01* (2006.01)
*G05B 19/05* (2006.01)

(52) U.S. Cl. .................................. 700/18; 700/7; 700/20

(58) Field of Classification Search .............. 700/18–21, 700/2, 7, 79; 714/43; 709/214
See application file for complete search history.

(56) References Cited

U.S. PATENT DOCUMENTS

| | | | |
|---|---|---|---|
| 5,586,259 A | 12/1996 | Kabe | |
| 5,963,444 A | 10/1999 | Shidara et al. | |
| 7,024,463 B1 | 4/2006 | Hitomi et al. | |
| 2006/0236189 A1 | 10/2006 | Kato et al. | |
| 2007/0055388 A1* | 3/2007 | Araki et al. | .................... 700/18 |

FOREIGN PATENT DOCUMENTS

| | | |
|---|---|---|
| EP | 1 231 526 A1 | 8/2002 |
| EP | 1 710 642 A2 | 10/2006 |
| EP | 1 710 642 A3 | 10/2006 |
| JP | 4 261241 | 9/1992 |
| JP | 7-13482 | 1/1995 |
| JP | 2002 358106 | 12/2002 |
| JP | 2006 302216 | 11/2006 |

OTHER PUBLICATIONS

Extended Search Report issued Jul. 29, 2011 in European Patent Application No. 07859838.0—1239/2098927.
Office Action issued Dec. 20, 2011, in Japanese Patent Application No. 2006-339822 with English translation.

* cited by examiner

*Primary Examiner* — John R. Cottingham
*Assistant Examiner* — Steven Garland
(74) *Attorney, Agent, or Firm* — Oblon, Spivak, McClelland, Maier & Neustadt, L.L.P.

(57) ABSTRACT

A station address displayed in a display field W5 coincides with a station address of the PLC to which this personal computer is connected. Further, bit addresses of respective output variables are displayed in a display field W1. For example, a corresponding bit corresponding to a check box whose address of the output variable is 00L1E and whose station address of the destination PLC is 2 is an output schedule definition bit Rb1E in an output schedule definition frame RF02 stored in a first storing unit TBL1. Therefore, a value of the output schedule definition bit Rb0E is defined as 0 (output is not scheduled). When an OK button W4 is clicked, respective output schedule definition frames are transferred to a PLC 10 and then are stored in the first storing unit TBL1 respectively.

4 Claims, 11 Drawing Sheets

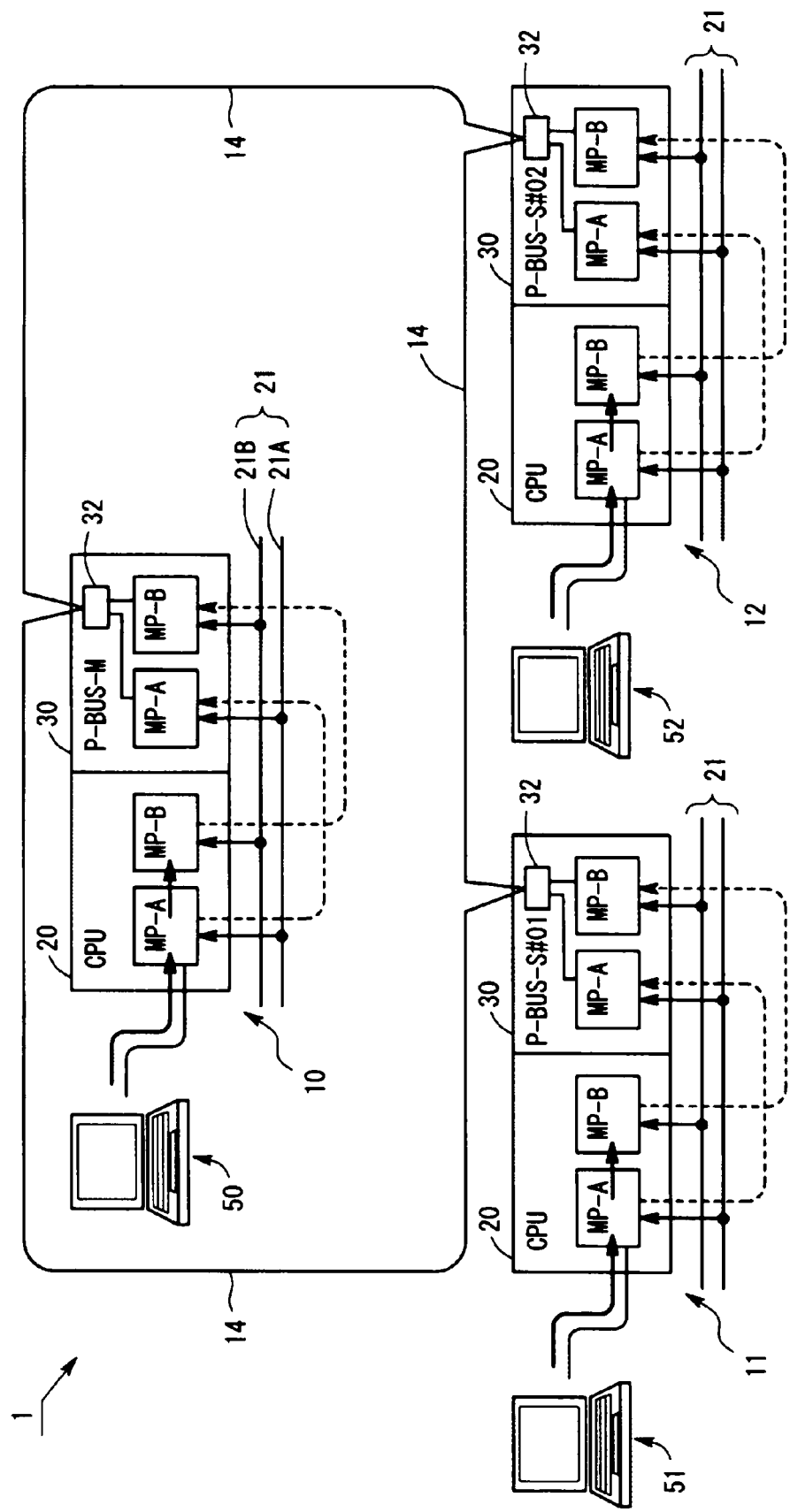

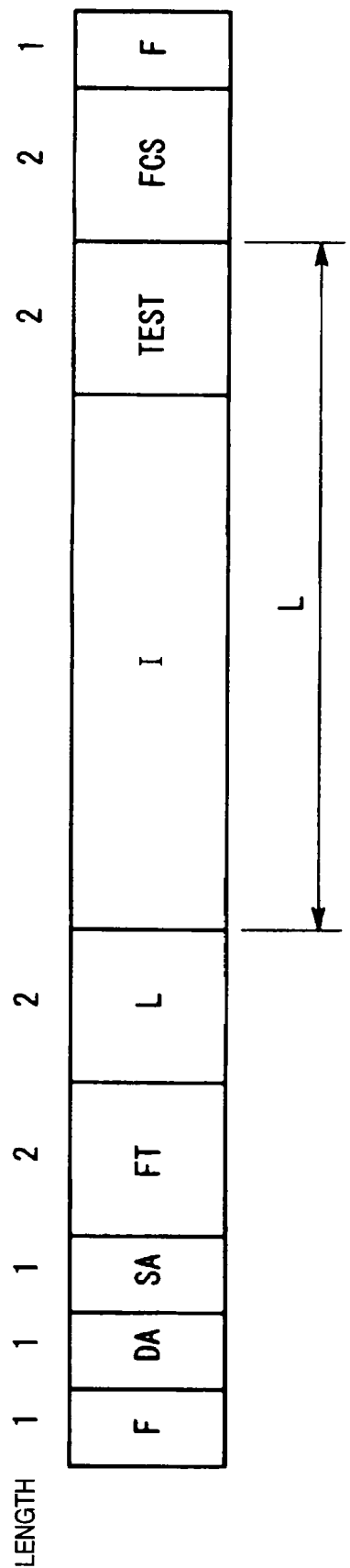

$$\begin{cases} RF0 = OR(RF01, RF02) \\ RF1 = OR(RF10, RF12) \\ RF2 = OR(RF20, RF21) \end{cases}$$

$(m \neq n)$

PLC DISTRIBUTED CONTROL SYSTEM

TECHNICAL FIELD

The present invention relates to a PLC distributed control system constructed by connecting a plurality of PLCs (Programmable Logic Controllers), each equipped with a communicating means. The present invention is useful in building up the safety system that conforms to international safety standards, or the like.

BACKGROUND ART

In a prior art PLC distributed control system, the memory means, the processing portion, etc. are multiplexed to build up the safety system based on the predetermined safety standards. The safety controller set forth in JP-A-2002-358106, and the like, for example, have been publicly known. Further, in factory automation, a plurality of machine facilities are controlled simultaneously. In some cases the distributed control system is constructed by connecting mutually distinct PLCs that control the machine facilities respectively. Further, in such a distributed control system, a demand for safety orientation is escalating and the reliability of the communication process between respective PLCs should be secured sufficiently by multiplexing, in parallel, the communication lines between respective PLCs, etc.

Further, there is an increasing need for an interlocking mechanism with high reliability in communication control that can hold the safety communication in such distributed control system and that can be constructed easily and effectively. Further, there is an increasing need for the distributed control system to be operated/managed effectively by using an expression format that can express the safety processing sequence in this system in an easy-to-understand manner.

DISCLOSURE OF THE INVENTION

Problems that the Invention is to Solve

However, in order to realize such safety communication whose reliability is high, such a necessity arises that every communication line should be tested prior to the actual operation of the distributed control system whether or not each communication established by the execution of each ladder diagram on each PLC can be held correctly via each communication line respectively. For this reason, such a problem arises that an operation efficiency of the distributed control system is decreased remarkably in building up the system, exchanging the ladder diagram (the sequence program), or the like.

Further, in the common PLC distributed control systems that are not limited to the safety system, there is the case where the ladder diagrams having the same or similar logic (algorithm) respectively should be operated in parallel, simultaneously on a plurality of different PLCs. In such a case, productivity of the object program can be improved significantly by applying similarly the existing programs that concretize similarly these logics (i.e. reuse of the existing programs) in respective PLCs respectively. However, the system configuration of the concerned distributed control system constituting the network becomes complicated at the same time in such case. Consequently, such a new need for operation/management that respective output variables of these PLCs should be systematized again to easily logically identify them, and then these output variables should be displayed on a ladder diagram, or the like in an easy-to-understand and easy-to-see format respectively.

The present invention has been made in view of the above circumstances, and it is an object of the present invention to realize safety communication with high reliability and to effectively improve operation efficiency in a test of communication lines, etc. in a PLC distributed control system.

Further, it is another object of the present invention to effectively improve a reusability of an existing program in a PLC distributed control system, and make it possible for an SE or an operation manager of the system to easily identify individual output variables that are output from respective PLCs constituting the PLC distributed control system.

Means for Solving the Problems

In order to solve the above problems, the following modes are applicable.

That is, a first aspect of the present invention provides a PLC distributed control system of broadcast type or multicast type, which is constructed by connecting a plurality of PLCs each having a communicating means, wherein each of PLCs includes first storing means for storing output schedule definition frames formed of output schedule definition information, which define whether or not output variables that simulate output coils in a ladder diagram executed on the PLC are scheduled to output to other PLCs every output variable, to correspond to other PLCs respectively, second storing means for storing reference schedule definition frames formed of reference schedule definition information, which define whether or not output variables that simulate output coils in a ladder diagram executed on other PLCs are scheduled to refer to every output variable, to correspond to other PLCs respectively, transmitting means for transmitting the output schedule definition frames or the reference schedule definition frames to other PLCs, receiving means for receiving the output schedule definition frames or the reference schedule definition frames from other PLCs, collating means for collating the output schedule definition frames with the reference schedule definition frames on a corresponding frame basis respectively, and normal communication start deciding means for deciding whether or not a normal communication in the PLC distributed control system is started, based on a collated result from the collating means.

Here, it is desirable that the safety PLCs in which respective processes are duplexed should be employed as the PLCs. Further, the programming language to describe the ladder diagram is not particularly limited, and either the graphic language or the text format language may be employed. Further, it is desirable that the output schedule definition information and the reference schedule definition information of one output variable should be handled as 1-bit information. In this case, respective definition frames are constructed by the bit column data.

Further, it is desirable that these means should be operated in constructing, starting, or restarting the system. Further, these means may be operated periodically.

Further, the communication lines that couple respective PLCs to accomplish the broadcast type or multicast type communication are not always duplexed. Further, the desired safety communication can be realized based on the present invention, by duplexing logically at least the communication lines, for example, by duplexing the packet, or the like.

Further, it is desirable that the physical communication lines should be constructed like a ring or a bus. Further, it is more desirable that such communication lines should be duplexed.

In a second aspect of the present invention, in the above first aspect, the transmitting means has station address attaching means for attaching a station address of the PLC to target transmission data to be transmitted, each of the PLCs has definition information inputting means for accepting an input of the output schedule definition information, and first frame producing means for producing the output schedule definition frames on the first storing means respectively, based on input information being input by the definition information inputting means.

Here, the output schedule definition frames may be produced on the first storing means by the almost similar means to that in the third aspect of the present invention instead of the second aspect of the present invention respectively, based on the extracted information extracted from the source program of the ladder diagram. Further, the PLC distributed control system of the present invention may be constructed by using the PLCs with such means.

Further, in a third aspect of the present invention, in the above first or second aspect, each of the PLCs has definition information extracting means for extracting the reference schedule definition information from a source program of the ladder diagram that is executed on the PLC, and second frame producing means for producing the reference schedule definition frames on the second storing means respectively, based on extracted information extracted by the definition information extracting means.

Here, the definition information extracting means may be constructed as an extension function of the compiler that compiles the source program, or the like, for example, or may be constructed by the independent tool from the compiler (code analysis program).

Further, a fourth aspect of the present invention provide a PLC distributed control system constructed by connecting a plurality of PLCs each having communicating means, which includes transmitting means for attaching a station address of the PLC to a target transmission data to be transmitted, and transmitting the transmission data to other PLCs; wherein each of PLCs has diagram edition displaying means for displaying operation contents of a ladder diagram executed on the PLC on a predetermined screen or a sheet of paper, and the diagram edition displaying means has station address acquiring means for acquiring a station address of the PLC in the PLC distributed control system, and display address code editing means for rewriting address codes of output variables, which simulate output coils on an object program that embodies a ladder diagram, into logical address codes of a format containing the acquired station address.

Here, the PLC in the fourth aspect of the present invention is not limited to the safety PLC in which the safety process is achieved by the various duplexed systems, or the like.

Further, the programming language to describe the ladder diagram is not particularly limited, and either the graphic language or the text format language may be employed. Further, the edition displaying mode about the output result of the diagram edition displaying means may be set arbitrarily. Further, means for causing the user to input directly the station address via a predetermined user interface may be employed as the station address acquiring means. For example, the station address may be acquired automatically by using the query command such as the diagnosis command, or the like.

The logical address code of the type containing the station address acts as the address codes that are recognized (seen with eyes) by the SE or the operation manager in the operation and the management.

Further, in a fifth aspect of the present invention, in any one of the first to third aspects, the transmitting means has station address attaching means for attaching a station address of the PLC to target transmission data to be transmitted, each of PLCs has diagram edition displaying means for displaying operation contents of a ladder diagram executed on the PLC on a predetermined screen or a sheet of paper, and the diagram edition displaying means has station address acquiring means for acquiring a station address of the PLC in the PLC distributed control system, and display address code editing means for rewriting address codes of output variables, which simulate output coils on an object program that embodies a ladder diagram, into logical address codes of a format containing the acquired station address.

Here, the programming language to describe the ladder diagram is not particularly limited, and either the graphic language or the text format language may be employed. Further, the edition displaying mode about the output result of the diagram edition displaying means may be set arbitrarily. Further, means for causing the user to input directly the station address via a predetermined user interface may be employed as the station address acquiring means. For example, the station address may be acquired automatically by using the query command such as the diagnosis command, or the like.

The logical address code of the type containing the station address acts as the address codes that are recognized (seen with eyes) by the SE or the operation manager in the operation and the management. With the above aspects of the present invention, the above problems can be solved effectively or rationally.

Advantages of the Invention

Advantages achieved by the above aspects of the present invention will be given as follows.

That is, according to the first aspect of the present invention, the definition frames (the output schedule definition frames or the reference schedule definition frames) are transmitted/received interactively through the communication lines between the PLCs, and the collating process is executed in the PLCs respectively. Accordingly, the states of at least the logical communication lines between the PLCs can be tested interactively automatically respectively throughout all lines. Further, it is tested at the same time whether or not transmission/reception states of the destination station are normal respectively.

Further, in this collating process, it is checked whether or not input conditions of individual output variables between the PLCs coincide with output conditions of them every corresponding frame. Therefore, it can be decided automatically about all output variables to be transmitted/received without omission whether or not the transmission/reception of the output variables to be input/output between the PLCs are executed correctively respectively.

Further, in executing the normal communication, the similar broadcast type or multicast type communication can be of course carried out safely based on the similar communication system to the above, i.e., by employing the communication system in which the transmission data frame in the same format as the above output schedule definition frame is transmitted/received between the PLCs respectively.

Therefore, according to the first aspect of the present invention, the safety communication can be established easily not to provide the relay station (master station), which performs the relay function of the communication between the slave stations, like the master PLC on the conventional PLC distributed control system employing the master/slave system. Therefore, at least concerning the communication control process, such a necessity can be omitted that the master PLC, in which the memory overhead or the CPU overhead is large and the program structure becomes complicated, should be provided. Otherwise, even when any master function is attached to a particular PLC, symmetry of a system topology (network structure) in the communication system can be maintained highly in the broadcast type or multicast type communication system according to the configuration of the first aspect. Therefore, the overhead of the communication control process of the PLC can be reduced effectively.

Therefore, according to the first aspect of the present invention, the interlocking control mechanism for use in the communication control to embody the safety communication can be constructed very easily without fail. Accordingly, the safety communication with high reliability can be realized very easily in the desired PLC distributed control system.

Further, according to the second aspect of the present invention, when the existing program on one PLC distributed control system is diverted to other PLC distributed control systems, the user can complete the desired diversion procedures equivalent to the address correcting procedures only by inputting the output schedule definition information from the above definition information inputting means, instead of the correction of the addresses of the output variables (coil outputs) of the PLC. In other words, according to the second aspect of the present invention, at a time of the diverting work of the existing program, all output schedule definition frames to be stored in the desired first storing means can be produced respectively by inputting the output schedule definition information from the above definition information inputting means, instead of the correction of the addresses of the output variables on the source program.

The reason why a necessity to amend the real addresses of the output variables on the object code of the PLC can be eliminated in this manner is that, based on the station address attaching action of the transmitting means, which attaches the station address of the PLC to the transmission data containing the output variables and transmits the resultant data to other PLCs, respective PLCs can expand the output variables on the storing area at the same address and that, based on the station address attached to the transmission data, respective PLCs can discriminate easily from which PLC the output variables of the data being received now are output on the CPU modules 20 of respective PLCs.

Further, in embodying the above definition information inputting means, the very simple user interface can be constructed by using GUI, the text input, or the like, for example. Therefore, the desired diverting procedures can be executed very effectively.

As a result, according to the second aspect of the present invention, the diversion of the existing program on the distributed control system can be carried out very effectively.

Further, according to the third aspect of the present invention, the reference schedule definition frames can be produced automatically on the second storing means based on the existing source program by the definition information extracting means and the second frame producing means. Therefore, according to the third aspect of the present invention, the safety communication between the PLCs in the PLC distributed control system can be realized very effectively.

Further, according to fourth or fifth aspect of the present invention, even when the addresses in the definition areas of the output variables overlap with each other between the PLCs, these output variables can be discriminated easily between the PLCs based on the similar action to the foregoing station address attaching action, and the ladder diagrams can be executed exactly not to cause a malfunction. Therefore, even though the operation of correcting the real addresses of the output variables is not applied to these object codes between the slave stations that are constructed symmetrically and operated by the same logic, for example, these object codes can be executed exactly without malfunction.

At the same time, the logical address code (logical expression) in the format containing the station address of the concerned PLC is employed in the address display of the output variables of respective PLCs on the ladder diagram, or the like. Therefore, the addresses of these output variables can be displayed on the ladder diagram, or the like in the easy-to-understand and easy-to-see format by the logical address codes in the format containing the concerned correct station address.

Therefore, according to fourth or fifth aspect of the present invention, even when the addresses in the definition areas of the output variables overlap with each other between the PLCs, the visual recognizability of SE, system operating manager, etc. for the address notation of the output variables displayed on the ladder diagram can be improved. As a result, the operation and management of the distributed control system can be facilitated.

Further, even though the operation of correcting the real addresses of the output variables is not applied to these object codes between the slave stations that are constructed symmetrically and operated by the same logic, for example, in the situation that the addresses in the definition areas of the output variables overlap with each other between the PLCs, these object codes can be executed exactly without malfunction. Therefore, for example, in providing a plurality of slave stations in which at least the processes concerning the communication control are handled by the same logic (i.e., no cascade connection is provided between the slave stations, and the slave stations are constructed similarly to have the same communication relationship with respect to the output variables that are referred to mutually between the master/slave stations) in parallel, the reusability of the existing program can be ensured extremely highly.

BRIEF DESCRIPTION OF THE DRAWINGS

FIG. 8 is an explanatory view explaining an operation of step S1 of the initial operation in FIG. 7.

FIG. 9 is a frame configurative view illustrating a data structure of a transmitting/receiving packet.

BEST MODE FOR CARRYING OUT THE INVENTION

The present invention will be explained based on concrete embodiments hereinafter.

Here, it should be noted that embodiments of the present invention are not limited to individual embodiments shown hereunder.

Embodiment 1

Figure 1:
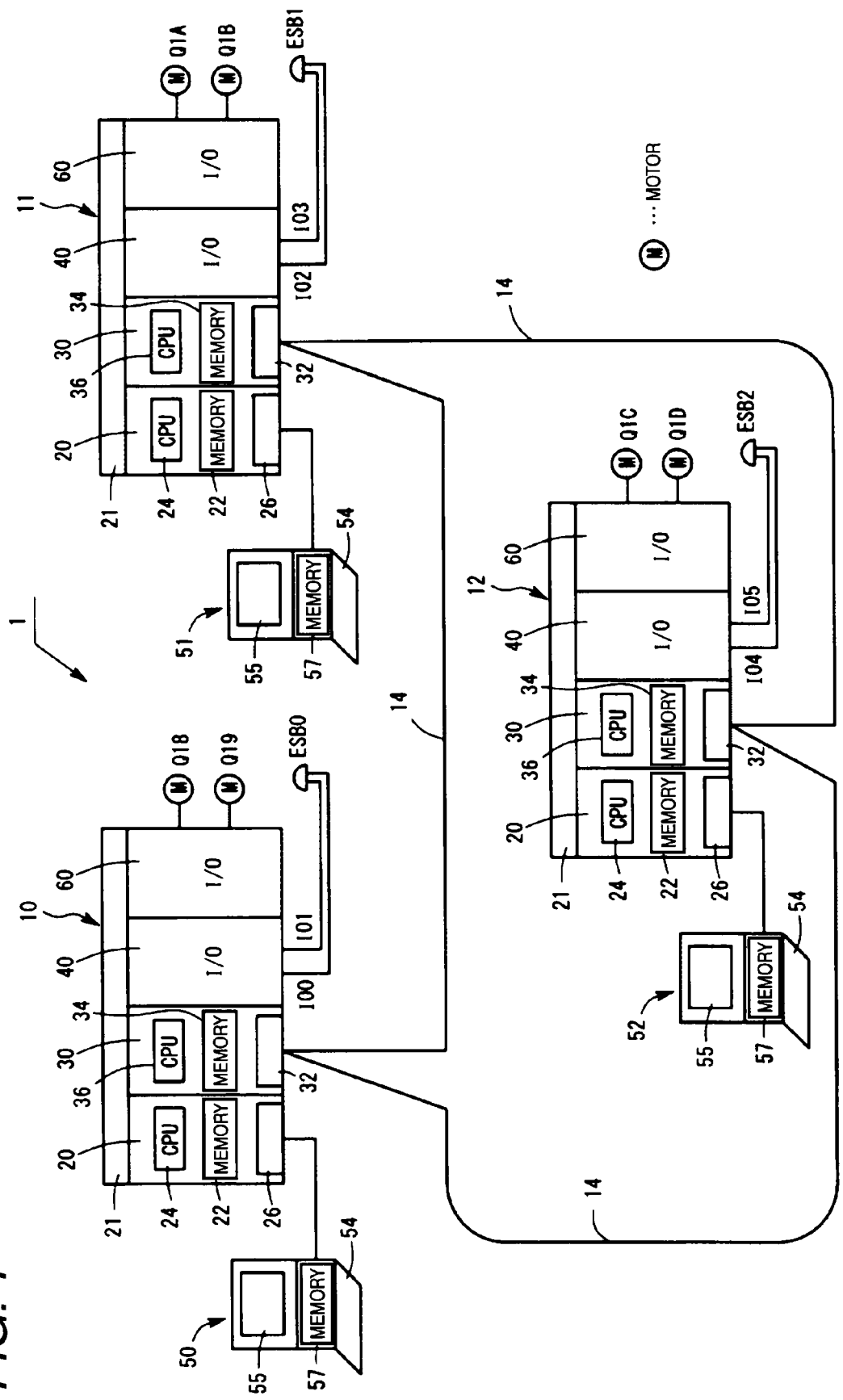
FIG. 1 is a system configurative view of a PLC distributed control system 1 of Embodiment 1.

A system configurative view of a PLC distributed control system 1 of Embodiment 1 is shown in FIG. 1. This PLC distributed control system 1 is applied to safely operate six motors having addresses Q18 to Q1D in total in asynchronism or in synchronism if necessary. These motors are used to drive the industrial machining robot, the machining equipment, and the like.

In the PLC distributed control system 1, slave PLCs 11, 12 and a master PLC 10 are connected like a ring by using a ring bus 14, and thus a broadcast type communication network is constructed. Each of these PLCs (10, 11, 12) is constructed by a CPU module 20, a communication control module 30, and I/O modules 40, 60, and these modules are connected mutually through a bus 21. These PLCs are constructed by the safe PLC in which respective portions such as a processing unit, a memory unit, etc. are duplexed as an A system and a B system respectively. Detailed discussions about a dual redundant configuration of respective portions will be postponed to FIG. 8, etc., and all portions will be explained simply as a single system configuration hereunder.

A sequence program described in a ladder diagram language is stored in a memory 22 of the CPU module 20. When the CPU module 20 causes a CPU 24 to execute this sequence program, this CPU module 20 can control respective modules or can operate together with respective modules. In this PLC distributed control system 1, the broadcast type safety communication is implemented. Further, the communication control module 30 of the master PLC 10 performs a synchronous controlling function (communication trigger producing/managing function) of sending out the command, the signal, etc., which are used to control a communication state on the ring bus 14, and the like, based on the command from the CPU module 20.

The communication control module 30 of each PLC is equipped with a bus interface 32, a memory 34, and a CPU 36. A communication program executed in compliance with a predetermined packet switching protocol is stored in the memories 34 respectively. When the communication control module 30 causes the CPU 36 to run this communication program based on the command received from the CPU module 20, such communication control module 30 controls transmission/reception of the packet on the ring bus 14 via the bus interface 32.

Further, duplexed emergency stop buttons (ESB0 to 2) are connected to the I/O modules 40 respectively. The unsafety state can be detected based on the status of the module.

In the PLC distributed control system 1 of Embodiment 1, personal computers 50, 51, 52 are also connected individually to an interface 26 of each CPU module 20 respectively. Each personal computer (50, 51, 52) is equipped with a keyboard 54, a display device 55, a memory 57, and the like. Of course, I/O units for a mouse and a printer, an external mobile memory medium, and the like may also be provided.

As the sequence program stored in the memory 22 of the CPU module 20, it is common that the program compiled on these personal computers are usually employed. However, the program that has already been produced (compiled) on other personal computers may be introduced via the external memory medium, for example.

Figure 2:
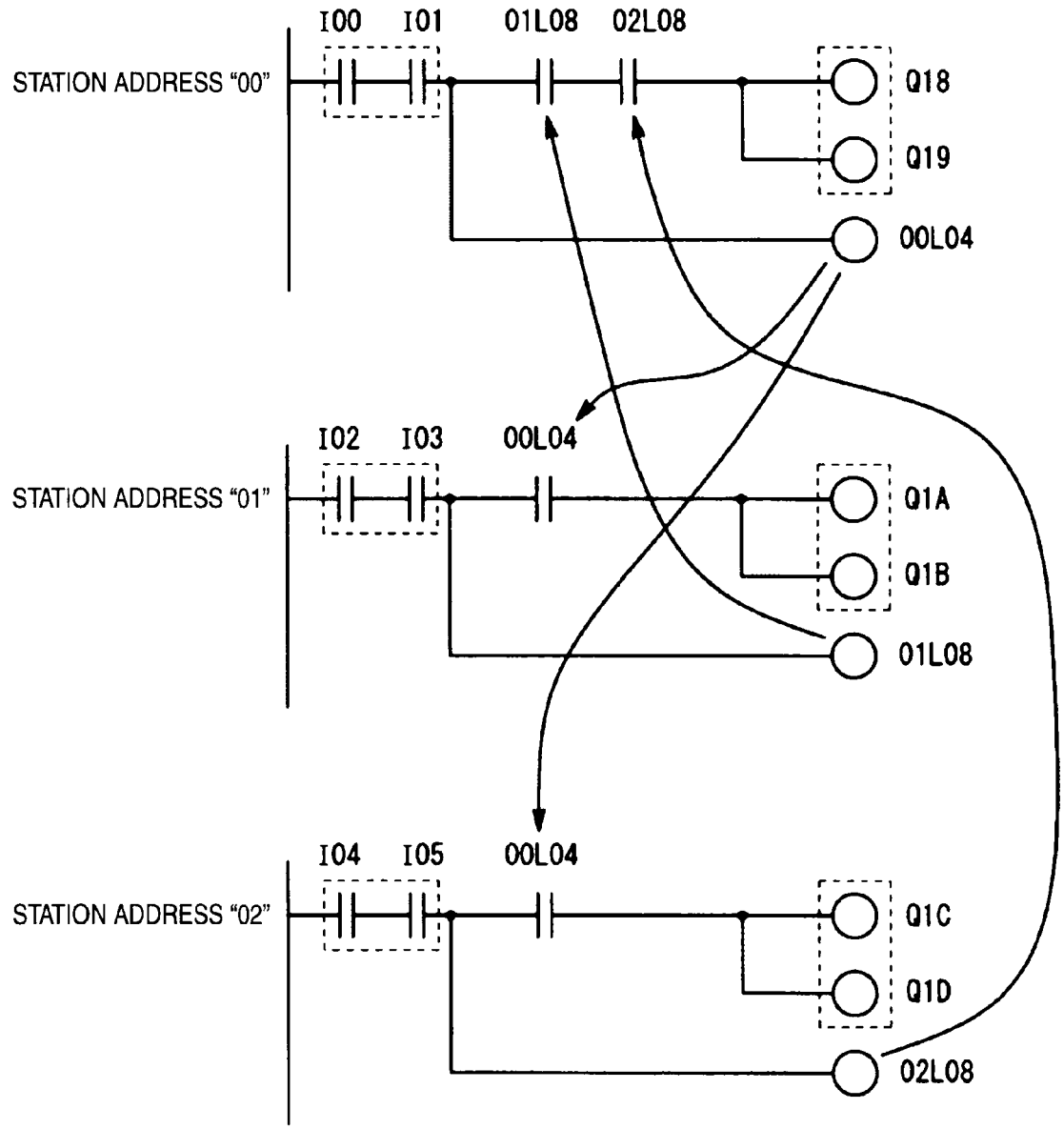
FIG. 2 is a ladder diagram illustrating a control mode of the PLC distributed control system 1.

A control mode of the PLC distributed control system 1 is illustrated in FIG. 2. In FIG. 2, the sequence programs that are to be executed on the CPU modules 20 of the PLCs 10 to 12 are expressed by using the ladder diagram. A station address "00" denotes a station address of the PLC 10, a station address "01" denotes a station address of the PLC 11, and a station address "02" denotes a station address of the PLC 12.

Input contacts (I00 to I05) and coils (Q18 to Q1D) encircled by a broken line in FIG. 2 correspond to the variable addresses (I00 to I05, Q18 to Q1D) in FIG. 1 respectively. These symbols show state variables that correspond directly to actually existing physical input/output subjects such as the emergency stop buttons, the motors, etc. on a one-to-one basis. Further, other state variables (00L04, 01L08, 02L08) not encircled by a broken line show logically simulated states of coils, etc. These state variables simulated logically will be called as I, type variables representing the link relay respectively or called simply output variables hereinafter.

In the address codes shown on the ladder diagram in FIG. 2, first two characters of the address notation of respective output variables (L type variables representing the link relay) coincide with the station address respectively, and the third character is fixed to "L". Further, an arrow in FIG. 2 indicates a reference relationship with each output variable.

According to the sequence program in which above mentioned ladder diagrams are coded executably, for example, the PLC distributed control system 1 can be stopped safely as soon as any of the emergency stop buttons (ESB0, ESB1, ESB2) is pressed. For example, when the duplexed emergency stop button ESB0 is pressed, at least any one of the input contact I00 and the input contact I01 is turned OFF and thus all motors (Q18 to Q1D) are urgently stopped. Further, when the emergency stop button ESB1 is pressed, only the motors Q18 to Q1B are urgently stopped.

Of course, instead of the emergency stop buttons or in addition to the emergency stop buttons, safety input devices such as various area sensors (e.g., light curtain, safety mat, etc.), etc. may be introduced.

In the PLC distributed control system 1 of Embodiment 1 constructed by using the safety PLC, as one of very important issues in realizing these safety mechanisms, the safety of the communication between respective PLCs can be listed. That is, it becomes very important to construct the interlocking mechanism for communication control, which ensures that the reference relationships indicated by arrows in FIG. 2 should always be satisfied safely, without fail.

The realizing system applied to construct the interlocking mechanism useful for such safety communication easily and without fail in the above PLC distributed control system 1 will be explained hereunder.

In Embodiment 1, assume that the above output variables (L type variables representing the link relay) transferred between respective PLCs via the ring bus 14 can be defined up to 32 variables at a maximum every respective PLCs (10 to 12) respectively. Further, the output variables (L type variables representing the link relay) of other PLCs, which one PLC can input (refer to), can be defined up to 32 variables in total. Therefore, the settable number of the input contacts and the coils (output variables), which are simulated logically to implement the communication in the system, is limited up to 32 every PLC respectively.

As a result, in compliance with the address notation in FIG. 2, for example, the output variables that can be defined in the PLC 10 whose station address is "00" have 32 logical addresses 00L00 to 00L1F.

Figure 3A:
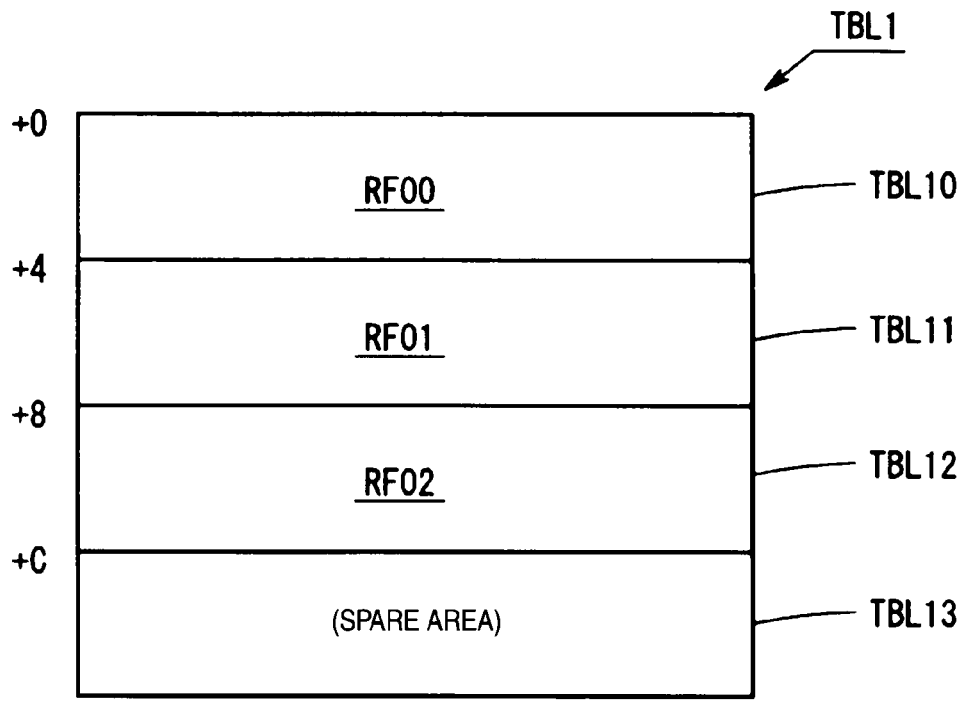
FIG. 3A is a table configurative view of first storing means TBL1.

FIG. 3A is a table configurative view of first storing means TBL1 in Embodiment 1. This first storing means TBL1 is means provided every PLC, and is constructed by four successive frame storing areas TBL10 to TBL13. All frame storing areas are formed of a 4-byte area. Further, output schedule definition frames RF00, RF01, RF02 serving as 4 byte data respectively are stored in these frame storing areas TBL10 to TBL13 on the PLC whose station address is 00 (i.e., PLC 10), for example. The frame storing area TBL13 is a spare area.

Figure 3B:
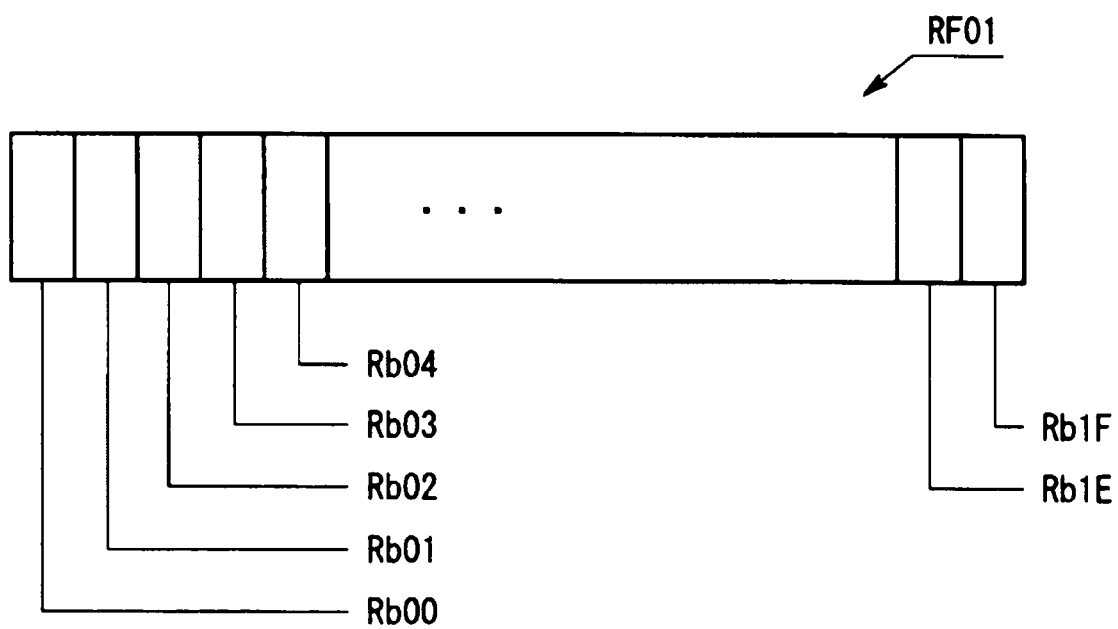
FIG. 3B is a frame configurative view of an output schedule definition frame RF01.

A frame configurative view of the output schedule definition frame RF01 is illustrated in FIG. 3B. This output schedule definition frame RF01 defines whether or not the output schedules of the output variables (00L00 to 00L1F), which simulate the output coils in the ladder diagram executed on the PLC 10 (station address=00), to the PLC 11 (station address=01) are present every output variable respectively. Output schedule definition bits Rb00 to Rb1F as a 32-bit string in total indicate whether the output schedule is present or not respectively. That is, the output schedule definition hits Rb00 to Rb1F correspond to output schedule definition information of the present invention.

Therefore, for example, when a value of the first bit constituting the output schedule definition frame RF01, i.e., a value of the output schedule definition bit Rb00, is 1, the output variable 00L00 is scheduled to be output (transmitted) from the PLC 10 (station address=00) to the PLC 11 (station address=01). Of course, presence or absence of this schedule depends upon the contents of the ladder diagram (sequence program) that the CPU module 20 of the PLC 10 (station address=00) executes. Similarly, when the output schedule definition frames RFmn (m=0,1,2; n=0,1,2) are defined hereunder, the bit string constituting the output schedule definition frames RFmn indicates whether or not the output variables (0mL00 to 0mL1F) being output from the station address m are scheduled to be output to the station address n, every corresponding hit.

As a result, at a time when n=m, all values of respective output schedule definition bits constituting the output schedule definition frame RFmn are 0.

Figure 4:
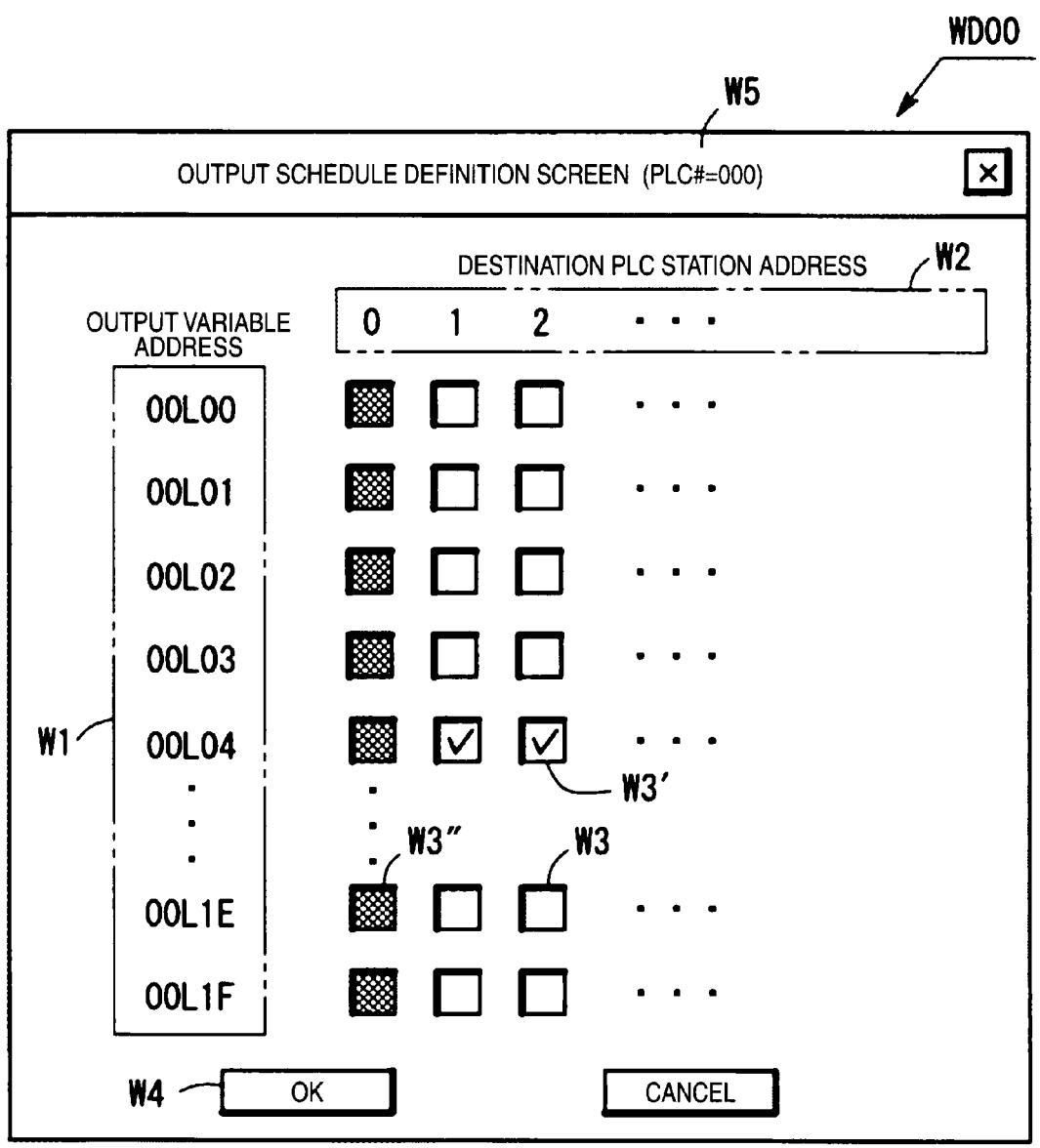
FIG. 4 is a layout diagram illustrating a display mode of an output schedule definition screen WD00.

A display mode of an output schedule definition screen WD00 (definition information inputting means) in Embodiment 1 is illustrated in FIG. 4. This screen is displayed on the display device 55 of the personal computer 50 connected to the PLC 10, and is out-put as an operation screen at the subsequent stage after an operation screen displayed at the preceding stage to designate the station address is operated. That is, the station address (PLC#=00) displayed in a display field W5 coincides with the station address of the PLC to which the personal computer 50 is connected.

Further, addresses (bit addresses) of respective output variables are displayed in a display field W1 of the output schedule definition screen WD00, and also the station addresses of the destination PLCs of these output variables are displayed in a display field W2.

Further, j×k check boxes (j column: the number of PLCs constituting the PLC distributed control system 1, k row: the maximum value of the number of the output variables that can be defined on each PLC) (W3, W3', W3") are aligned in a center of this screen in a matrix fashion. A value of the bit corresponding to the check box W3 in which a check mark (✓ mark) is not placed is defined as 0. For example, a bit corresponding to the check box, the output variable address of which is 00L1E and the station address of the destination PLC of which is 2, on the output schedule definition screen WD00 is the output schedule definition bit Rb1E in the output schedule definition frame RF02 stored on the first storing means TBL1. Thus, a value of the output schedule definition bit Rb1E is defined as 0 (: not scheduled to output).

Similarly, a value of the bit corresponding to the check box W3' in which a check mark (✓ mark) is placed is defined as 1. For example, a bit corresponding to the check box, the output variable address (bit address) of which is 00L04 and the station address of the destination PLC of which is 1, on the output schedule definition screen WD00 is the output schedule definition bit Rb04 in the output schedule definition frame RF01 stored on the first storing means TBL1. Thus, a value of the output schedule definition bit Rb04 is defined as 0 (: scheduled to output).

Further, the output variables (L type variables representing the link relay) that the PLC itself outputs are not sent to the PLC itself at all. Therefore, the operator cannot designate (cannot place the ✓ mark in) the check boxes W3" located in the leftmost column.

When an OK button W4 is clicked at a point of time the checking operations of above check boxes are completed, respective output schedule definition frames that are defined correctively in accordance with the user's operation on the output schedule definition screen WD00 are transferred at a time from the personal computer 50 to the PLC 10 in response to this clicking (trigger), and then stored on the first storing means TBL1 in FIG. 3A respectively.

A frame structure of the reference schedule definition frames and a system producing the frames of the present invention, which are compared with these output schedule definition frames, will be explained hereunder.

Figure 5A:
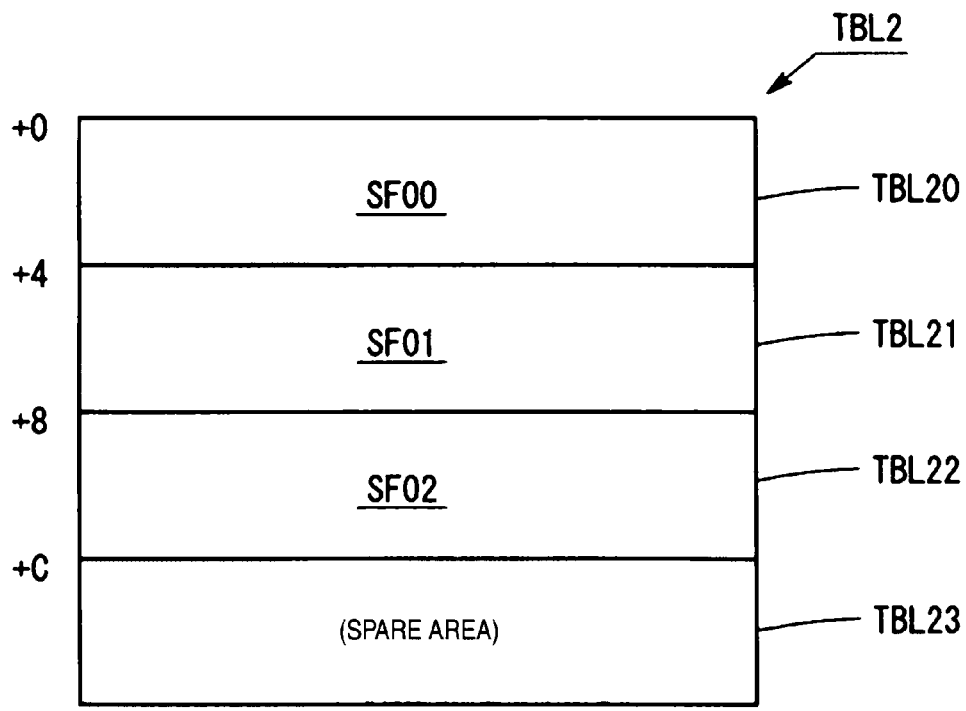
FIG. 5A is a table configurative view of second storing means TBL2.

FIG. 5A is a table configurative view of second storing means TBL2 in Embodiment 1. This second storing means TBL2 is means provided every PLC, and is constructed by four successive frame storing areas TBL20 to TBL23. All frame storing areas are formed of a 4-byte area. Further, reference schedule definition frames SF00, SF01, SF02 serving as 4 byte data respectively are stored in these frame storing areas TBL20 to TBL23 on the PLC whose station address is 00 (i.e., PLC 10), for example. The frame storing area TBL23 is a spare area.

Figure 5B:
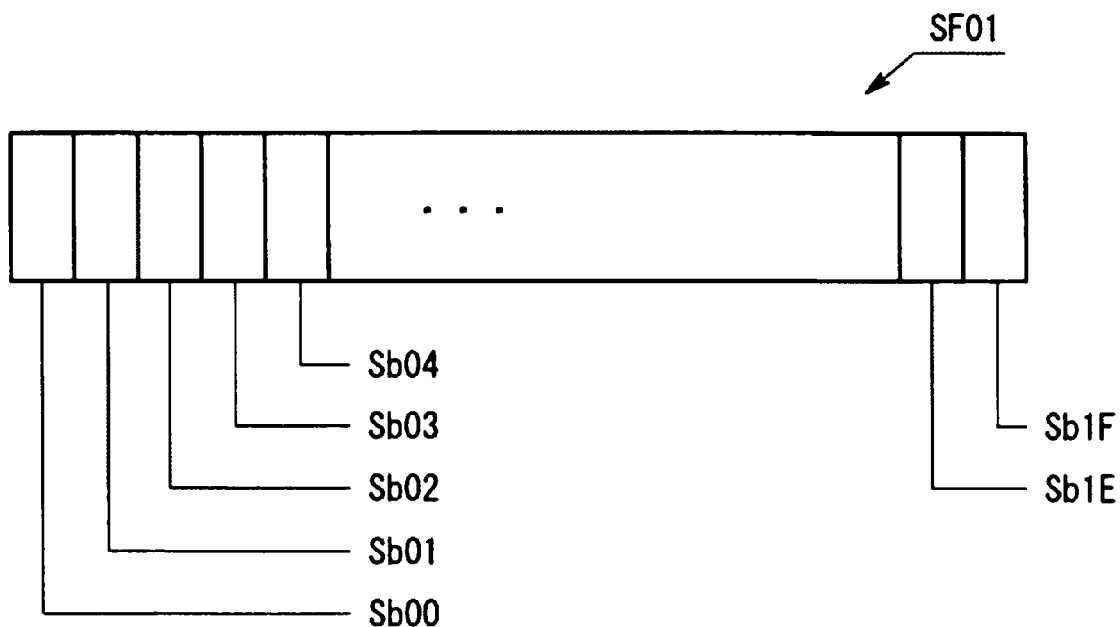
FIG. 5B is a frame configurative view of a reference schedule definition frame SF01.

A frame configurative view of the reference schedule definition frame SF01 is illustrated in FIG. 5B. This reference schedule definition frame SF01 defines whether or not the reference schedules of the output variables (01L00 to 01L1F), which simulate the output coils in the ladder diagram executed on the PLC 11 (station address=01), on the PLC 10 (station address=00) are present every output variable respectively. Reference schedule definition bits Sb00 to Sb1F as a 32-bit string in total indicate whether the reference schedule is present or not respectively. That is, the reference schedule definition bits Sb00 to Sb1F correspond to reference schedule definition information of the present invention.

Therefore, for example, when a value of the first bit constituting the reference schedule definition frame SF01, i.e., a value of the reference schedule definition bit Sb00, is 1, the output variable 01L00 is scheduled to be referred to (received) on the PLC 10 (station address=00). Of course, presence or absence of this schedule depends upon the contents of the ladder diagram (sequence program) that the CPU module 20 of the PLC 10 (station address=00) executes. Similarly, when the reference schedule definition frames SFmn (m=0, 1,2; n=0,1,2) are defined hereunder, the bit string constituting the reference schedule definition frames SFmn indicates whether or not the output variables (0nL00 to 0nL1F) being output from the station address n are scheduled to be referred to in the station address m, every corresponding bit.

An operation of a reference variable table producing program PGa will be explained with reference to FIG. 6 hereunder. For example, addresses of the output variables (L type variables representing the link relay) are expressed by the address in the logical format, i.e., the logical addresses in the "y1 y2 Lz1 z2" format, on individual source codes such as the ladder diagram executed on the PLC of the station address "00" in FIG. 6, and the like. Here, "y1" and "y2" denote the station address of the PLC respectively, and "z1" and "z2" denote the bit address on the output variable definition area respectively.

Then, when these source codes are input into the reference variable table producing program PGa, a reference variable table TBa is produced and output. The output variables referred to at the input contacts that are defined (simulated) logically in such source codes are listed and registered in this reference variable table TBA. The reference variable table TBa is constructed by a set of 2-byte information, which is composed by aligning successively 2-byte information. That is, as can be seen from the correspondence to the ladder diagram in FIG. 6, lower bytes of respective 2-byte information represent the station address of the PLC that outputs the output variable referred to at the input contact. Further, upper bytes represent the hit address of the output variable.

Such reference variable table producing program PGa may be prepared as an option of the compiler, an extension function, or the like or may be prepared as a single tool. When the reference variable table TBa is transferred from the personal computer 50 to the CPU module 20 of the PLC 10 and the data are converted on the CPU module 20, the reference schedule definition frames SF00, SF01, SF02 are produced in the PLC whose station address is 00 (i.e., the PLC 10), for example, and stored in the second storing means. Of course, the reference schedule definition frames are similarly produced on the second storing means in other PLCs.

Figure 7:
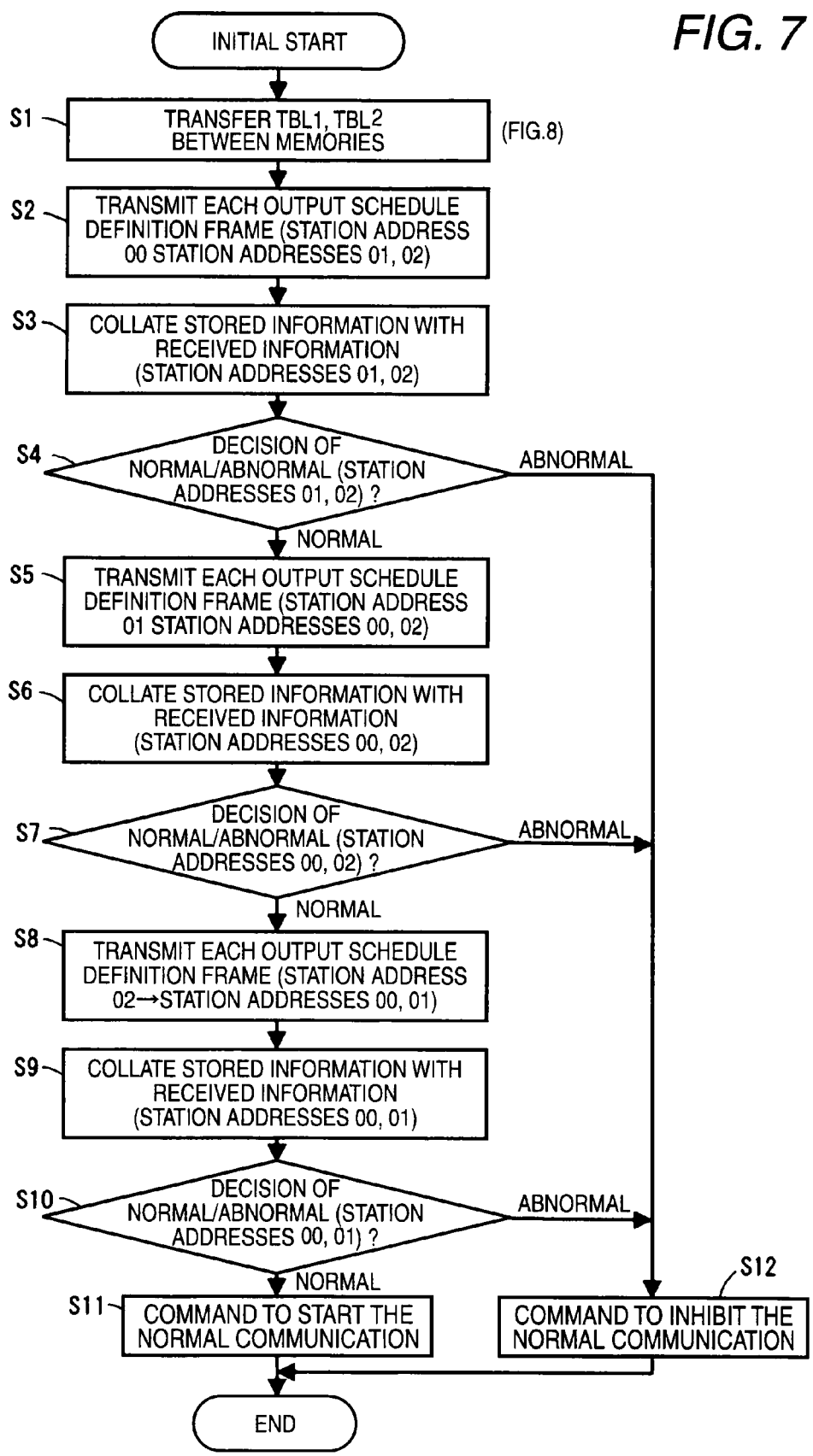
FIG. 7 is a flowchart showing an initial operation of the PLC distributed control system 1.

An initializing process (initial operation) of the safety communication of Embodiment 1 will be explained with reference to FIG. 7 and FIG. 8 hereunder. FIG. 7 is a flowchart showing an initial operation of the overall PLC distributed control system 1.

In this controlling process procedures, in step S1, first the output schedule definition frames and the reference schedule definition frames are produced respectively in the first storing means and the second storing means on respective PLCs by executing such definition frame producing process on every PLC.

An operation of step S1 of the initial operation is illustrated in FIG. 8 hereunder. As shown in FIG. 8, actually the CPU module 20 having the memory 24 in FIG. 1 is duplexed into two processing systems in parallel as an A system and a B system. Of course, the first storing means and the second storing means in each PLC are duplexed and produced on respective microprocessors (MP-A, MP-B) in the A system and the B system on the CPU 20.

Therefore, the initial operation of the safety communication explained hereunder are of course executed in parallel in respective processing systems of the A system and the B system mutually respectively. In the following, only the process in one system will be explained along with a flowchart in FIG. 8.

Then, in step S2, the process to be executed at the station address 00 is shown. Here, the output schedule definition frame RF01 is sent out to the PLC whose station address is 01, and also the output schedule definition frame RF02 is sent out to the PLC whose station address is 02.

A data structure (frame structure) of the packet sent out at this time is illustrated in FIG. 9. This packet is used to transmit/receive the above output schedule definition frame RF01 (four byte) as a part of the information portion I, and is based upon the common packet switching protocol. Here, particularly a feature resides in that the destination address (PLC station address DA) and the sender address (PLC station address SA) are assigned to each packet.

Then, such means for attaching the destination station address to transmission data corresponds to station address attaching means of the present invention.

In this case, a type code of data constituting the information portion I (example: command type, or the like), a control bit concerning the data structure of the frame, etc. are contained in a frame type FT (2 byte). Further, control information used in the synchronization control of communications, the abnormal contact, etc. can be contained in the information portion I.

The ring bus 14 in FIG. 8 is duplexed into the backup optical fiber cable and the normal communication optical fiber cable. The duplexed system about the safety communication at a time of normal communication herein is multiplexed in parallel at a packet level. That is, the addresses of the microprocessors (MP-A, MP-B) constituting the communication control modules 30 are set differently mutually, and the communication process of the A system and the communication process of the B system are always executed while constituting a paired set. At this time, for example, first the MP-A transmits data a, and then the MP-B transmits data b in which bits of the data a are inverted respectively. (Here, a test bit (TEST) is not inverted).

Then, in step S3, subsequent processes that are to be executed in the CPU modules 20 of the PLC of the station address 01 and the PLC of the station address 02 are shown. That is, in the CPU modules 20 of the PLC of the station address 01, the contents of the output schedule definition frame RF01 transmitted from the station address 00 to the station are collated bit by bit with the contents of the reference schedule definition frame SF01 stored in the second storing means of the PLC. Further, in the CPU modules 20 of the PLC of the station address 02, the contents of the output schedule definition frame RF02 transmitted from the station address 00 to the station are collated bit by bit with the contents of the reference schedule definition frame SF02 stored in the second storing means of the PLC.

Then, in step S4, it is decided whether or not there is the inconsistent bit in both collating processes. The process goes to step S12 if there exists the inconsistent bit in either of both processes (step S4, abnormal), while the process goes to step S5 if there exists no inconsistent bit (step S4, normal).

In step S5 to step S7, the similar processes to step S2 to step S9 are executed by changing standpoints mutually, while replacing their roles of the PLCs mutually by shifting them cyclically. As the result of collation, if there exists no inconsistent bit (step S7, normal), the process goes to next step S8. Namely, these collating processes are executed in the PLC distributed control system 1 such that such processes are repeated through several PLCs rotationally symmetrically.

Therefore, for example, in step S8 to step S10, the similar processes to step S5 to step S7 are executed by changing standpoints mutually, while replacing their roles of the PLCs mutually by shifting them cyclically. As the result of collation, if there exists no inconsistent bit (step S10, normal), the process goes to next step S11.

Then, in step S11, the process to start the normal communication, i.e., the process of outputting the start command is executed. In contrast, in step S12, the process to inhibit the normal communication, i.e., the process of outputting the inhibit command is executed.

According to above configuration, the output schedule definition frames RFnm are transmitted/received interactively through the communication lines between the PLCs, and the collating process is executed in the PLCs respectively. Accordingly, the states of respective packet lines in the A system and the B system between the PLCs can be tested interactively automatically respectively throughout all lines. Further, it is tested at the same time whether or not transmission/reception states of the destination station are normal respectively.

Further, in the above collating process, it is checked whether or not input conditions of individual output variables between the PLCs coincide with output conditions of them for every corresponding frame (the output schedule definition frames RFnm=the reference schedule definition frame SFnm). Therefore, it can be decided automatically about all output variables to be transmitted/received without omission whether or not the transmission/reception of the output variables to be input/output between the PLCs are executed correctively respectively.

As a result, in the normal communication, such a possibility is eliminated that, due to a mismatching of the definition in the reference relationship between the output side and the reference side, a malfunction is caused in the sequence program.

Figure 10A:
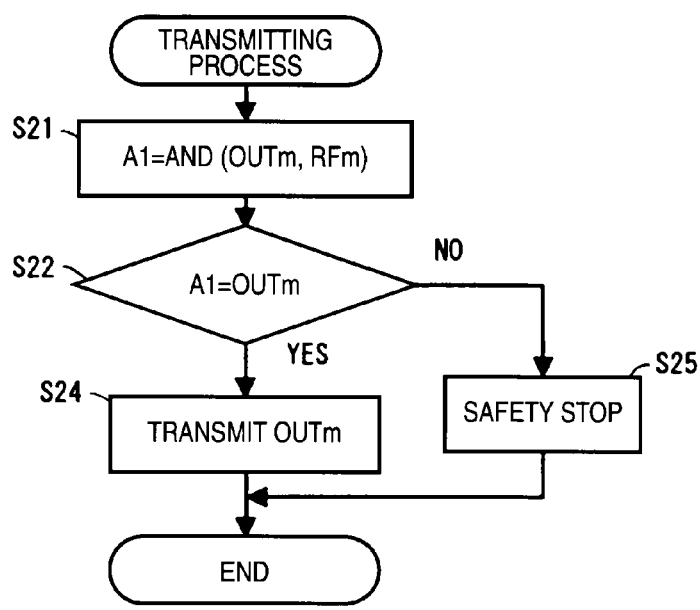
FIG. 10A is a flowchart illustrating another using mode of the output schedule definition frame.

Another using mode of the above output schedule definition frame RFmn in the normal communication is illustrated in FIG. 10A. The transmitting process in FIG. 10A is applied to establish the broadcast type communication, and is carried out every time at a time when the normal communication is executed to send out the output variable from the PLCs. Here, an output variable frame OUTm in FIG. 10A represents 4-byte data that consists of 32 bits in outputting output variables 0mL00 to 0mL1F that are defined on the PLC of the station address m (i.e., as the calculated result).

Further, a constant RFm (example: RF0=OR (RF01, RF02)) is 4-byte data that consists of resultant bits of all cumulative logical sums of all entries that are registered in the first storing means on the CPU module 20 of the PLC of the station address m (i.e., the output schedule definition frames RFmi (i=0 to a total number of the PLCs-1)), every corresponding bit.

In this transmitting process, in step S21, first a calculated result of a logical product operation (AND operation) of the output variable frame OUTm and the above constant RFm is stored in a 4-byte working area A1 every corresponding bit. Then, in step S22, the calculated result (A1) is compared with a value of the output variable frame OUTm. Then, the process goes to step S24 if all bit values coincide completely with each other between both numerical values (step S22, YES), while the process goes to step S25 if all bit values do not coincide with each other (step S22, No).

Then, in step S24, the output variable frame OUTm is set in a predetermined area in the information portion I in FIG. 9, and a transmission packet is transmitted to other PLCs by addressing all PLCs as the destination (all station addressing). In contrast, in step S25, the PLC distributed control system 1 is safely stopped in accordance with a predetermined urgent stopping process program.

According to the above transmitting process, the system can be safely stopped by the actions in steps S21, S22, S25 even though the program defect, e.g., the output variables that are not updated essentially are ON-set needlessly, is contained reluctantly in the sequence program that is applied to control the CPU module 20 of the PLC on the transmitting side.

Otherwise, according to the above transmitting process, the system can be safely stopped even in such a situation that a different program that has no relevance essentially at all is downloaded by mistake as the sequence program that is applied to control the CPU module 20 of the PLC on the receiving side and then the wrong output schedule definition setting operation that goes just along with this wrong downloading is input from the output schedule definition screen in FIG. 4.

Figure 10B:
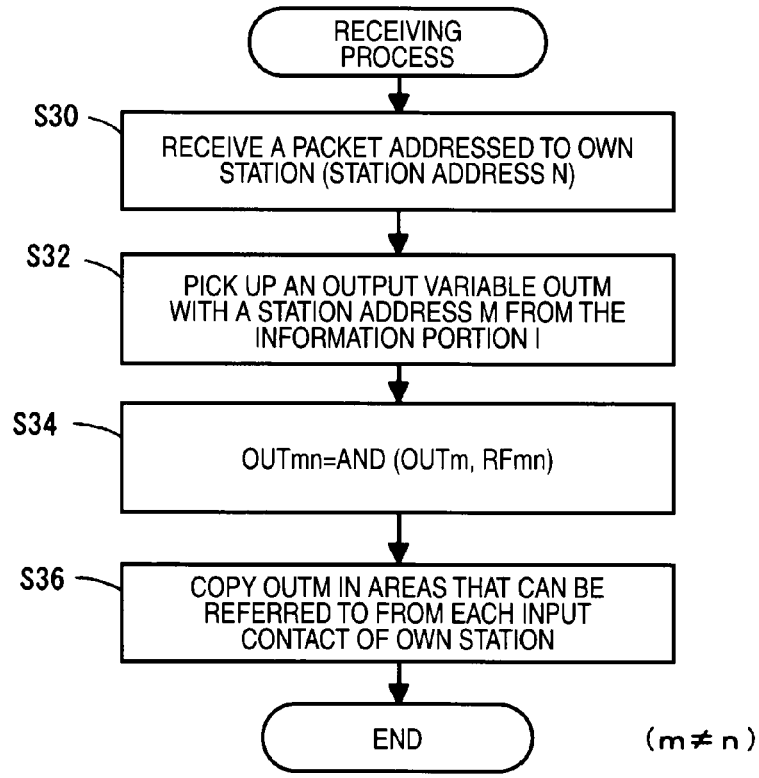
FIG. 10B is a flowchart illustrating another using mode of the reference schedule definition frame.

Meanwhile, another using mode of the reference schedule definition frame in the PLC on the receiving side is illustrated in FIG. 10B. In the receiving process of the PLC, in step S30, first the PLC receives the packet addressed to the station (station address n) from the ring bus 14. Of course, the packet that is addressed to all stations is the packet that is addressed to the station.

Then, in step S32, the output variable frame OUTm (: 32-bit information) of the sender (station address m; m≠n) in the information portion I (FIG. 9) of the packet is picked up. Then, in step S34, only the output variables that the station should refer to are chosen by executing the logical product calculating process of "OUTmn=AND (OUTm, SFmn)", i.e., the masking process of the output variable frame OUTm oriented to the station (: receiving station). Then, in step S36, the output variable frame OUTm from which only the reference bits that are to be referred to at the station (the output variables) are chosen is copied in the predetermined area where the input contacts (i.e., the referring process program) of the station can be referred to.

For example, according to the above transmitting/receiving processes, in the normal communication, the transmitting process necessary for the output variation at that time can be completed on the PLC on the transmitting side by using the "all station addressing" when the output variable frame OUTm of the station is sent out only once to the network (ring bus 14). That is, the highly efficient transmitting process can be carried out by using the desired broadcast type communication. Further, in accordance with such safety communication system, mismatching of the reference relationship between the transmitting side and the receiving side with regard to the output variables is not caused. As a result, the sequence program can be executed safely without malfunction.

Instead of step S34, the similar process to that in step S34, i.e., the process of "OUTmn=AND (OUTm,RFmn)" may be provided at the preceding stage of step S24, and the addressing of the destination station address, i.e., the addressing of the station address n on the receiving side may be executed in step S24. According to this, the multicast type communication can be realized instead of the broadcast type communication. That is, according to the collating process of Embodiment 1, upon executing the multicast type safety communication, the sequence program can be executed exactly while eliminating in advance the mismatching of the reference relationship between the transmitting side and the receiving side with regard to the output variables.

Embodiment 2

Figure 11:
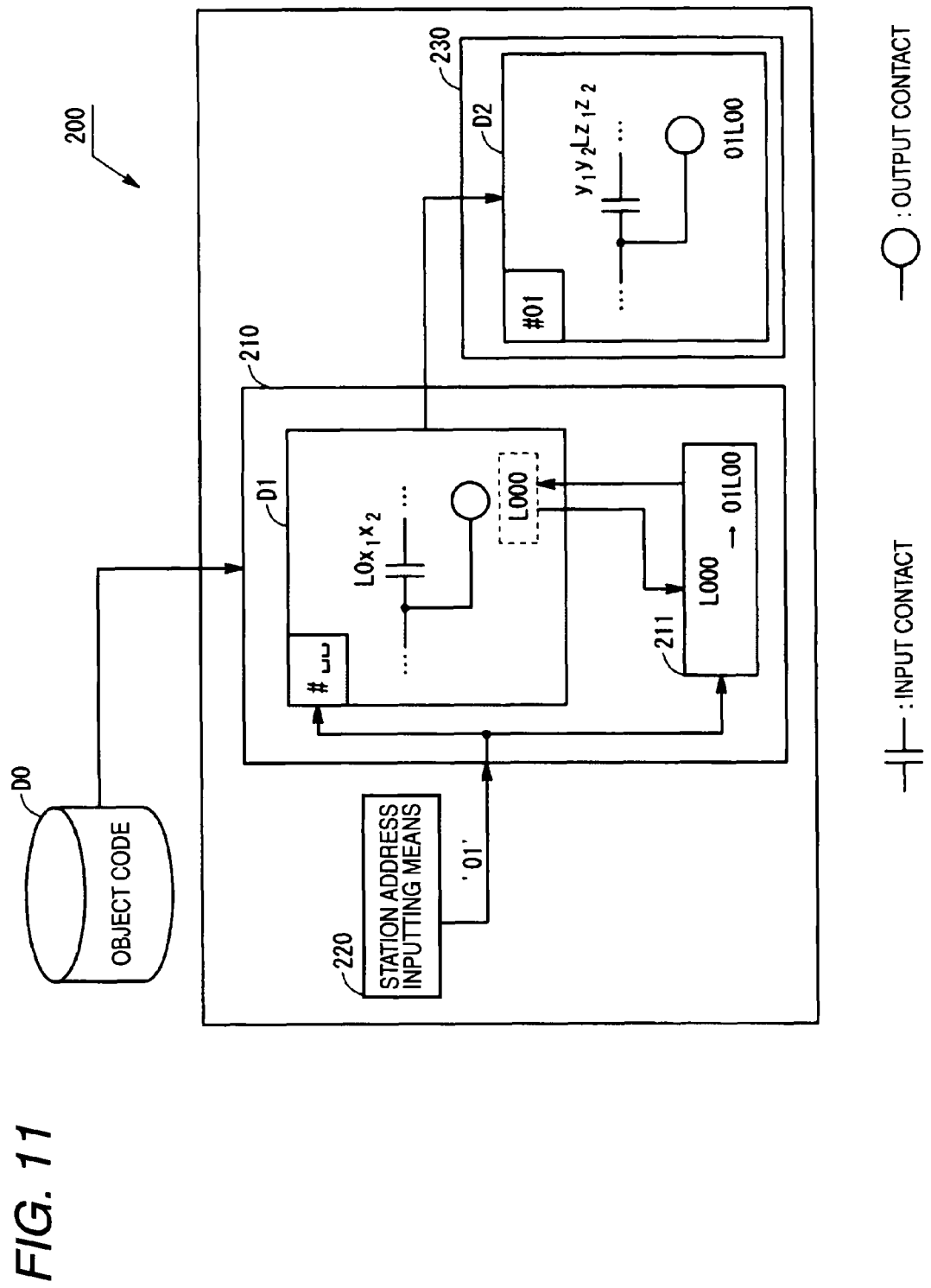
FIG. 11 is a program configurative view showing a structure and an operation of diagram edition displaying means 200 of Embodiment 2.

A structure and an operation of diagram edition displaying means 200 of Embodiment 2 are shown in FIG. 11. The diagram edition displaying means 200 is provided to edit a ladder diagram D2 indicating the operation based on an object code D0, and display the edited result on a predetermined visible output medium (a screen or a sheet of paper). The diagram edition displaying means 200 is equipped with a diagram editing program 210, station address inputting means 220, and diagram displaying means 230. For example, the station address inputting means 220 can be constructed by the keyboard 54 in FIG. 1 of Embodiment 1, or the like, and this means corresponds to station address acquiring means of the present invention. That is, the diagram edition displaying means 200 can be produced on the personal computer by connecting the personal computers 50, 51, 52, etc. every PLC. Further, as the diagram displaying means 230, the display device 55 in FIG. 1, or the like may be employed, or alternately the printer, or the like may be employed.

A ladder diagram D1 positioned in a center of FIG. 11 shows the intermediate result in the ladder diagram editing process of the diagram editing program 210. As the real addresses (L0x1x2, L000) of the input contacts and the output variables in the ladder diagram D1, respective values on the object code D0 are indicated as they are. Such intermediate result (the ladder diagram D1) can be edited based on the prior art. In this case, the diagram edition displaying means 200 is also equipped with the station address inputting means 220 for inputting the station addresses of the PLCs in which the ladder diagram is executed, and display address code editing means 211 for rewriting the real addresses of the output variables into the logical address codes containing the station address based on the input station address. Therefore, the address display codes such as the output variables L000, etc., for example, are edited as follows, and then displayed in the ladder diagram. D2 that the diagram displaying means 230 outputs.

In the PLC distributed control system to which Embodiment 2 is applied, the output variables (L type variables representing the link relay) can be defined up to 32 variables at a maximum every PLCs respectively, and respective PLCs have the transmitting means (the communication control module 30 in FIG. 1) for transmitting the transmission data, which contain the output variables and to which the station address of the PLC is assigned, to other PLCs. Therefore, the real address ad of the output variable on that PLC is expanded as the real address (L000≦ad≦L01F) in the same range on individual object codes D0 in all PLCs. That is, the output variable storing areas overlap with each other completely on the CPU modules 20 of the PLCs respectively. This is because it can be discriminated easily on the CPU modules 20 of respective PLCs from which PLC the received output variables were output, based on the station address attached to the transmission data.

Therefore, the display address code editing means 211 works only on the variables that have the real address ad in this range (L000 to L01F) (i.e., the above output variables).

More concretely, a predetermined editing subroutine (i.e., the display address code editing means 211) is invoked every time when the output variables (L type variables representing the link relay) whose real address is within the above range is detected during the execution of the diagram editing program 210, i.e., while the ladder diagram D1 is being edited by the diagram edition displaying means 200. Thus, a desired address code changing process (L0x1 x2→nnLx1 x2) can be applied to the output variables on the PLCs respectively. Here, "nn" denotes the input station address, and corresponds to the station address '01' input from the station address inputting means 220 in FIG. 11.

Meanwhile, the editing process of "L0x1 x2→y1 y2 Lz1 z2" concerning the addresses of the output variables that are referred to at the input contacts defined (simulated) logically, i.e., the code converting process of "x1 x2→(y1 y2, z1 z2)", can be executed by executing the inverse transformation in compliance with a predetermined compile rule used in producing the object code D0. Accordingly, the logical address codes that the user should recognize in management correspond correctly to the real addresses of respect input contacts on the object code D0 respectively.

(Advantage 1 of Embodiment 2)

A copy of this program (copy program) can be used simultaneously between a plurality of PLCs even if no amendment is applied to the existing program (the object code D0). Accordingly, a diversion rate of the existing program, i.e., productivity of the object program can be improved effectively. Such diversion of the existing program is effective, for example, in the case where the ladder program (object program) executed at the station address "02" in FIG. 2 is applied as it is to the station address "01" in FIG. 2, or the like. Further, in the PLC distributed control system in which a large number of slave PLCs like the station address "01" and the station address "02" in FIG. 2 are equipped in parallel, the similar advantage/effect can also be attained similarly through many times.

(Advantage 2 of Embodiment 2)

The station address can be attached to the head portion of the address of the output variables (L000 to L01F) of the same type, which are not discriminated mutually on the object code D0, based on the input information (station address) from the station address inputting means 220 (station address acquiring means). Therefore, the output variables of respective PLCs can be discriminated on the ladder diagram D2 and can be identified precisely, and the identification can be facilitated.

(Advantage 3 of Embodiment 2)

Figure 6:
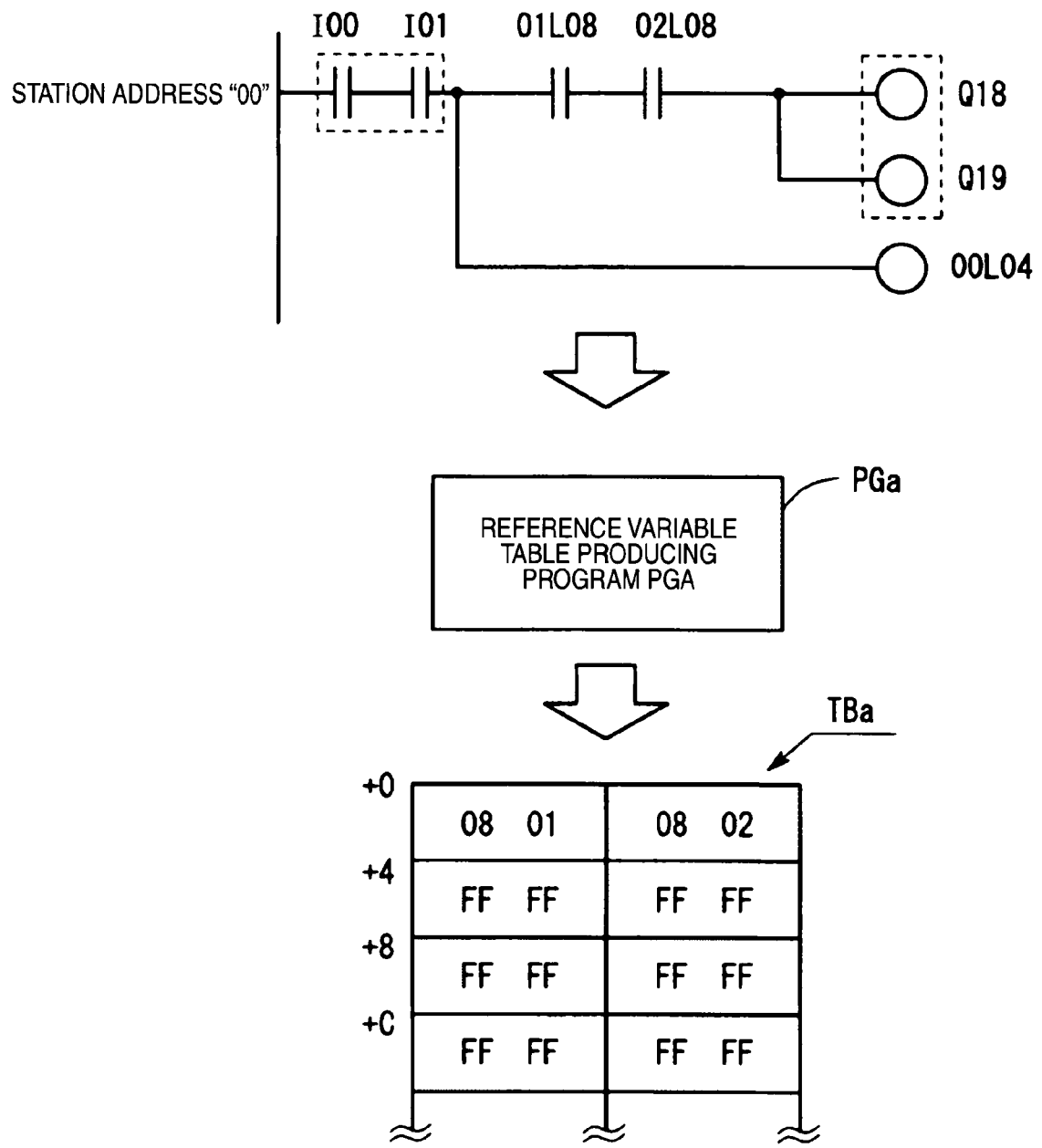
FIG. 6 is an explanatory view explaining an operation of a reference variable table producing program PGa.

In the address display of the output variables of the PLC#1 on the ladder diagram D2, the logical address code in the format containing the station address "01" of the PLC, i.e., the logical address (01L00, y1 y2 Lz1 z2) of the coding format mentioned by reference to FIG. 6 can be employed. Therefore, the visual recognizability of SE, system operating manager, etc. for the address notation of the output variables displayed on the ladder diagram D2 can be improved. As a result, the operation and management of the distributed control system can be facilitated.

(Synergistic Effect of Embodiments 1, 2)

Therefore, when this diagram edition displaying means 200 is applied to the PLC distributed control system 1 of Embodiment 1, the synergistic effect created from respective advantages/effects by respective embodiments can be achieved, so that an operation efficiency in the test of the communication line, and the like can be improved and the safety communication with high reliability can be realized. Further, the reusability of the existing program can be improved effectively, and also it is possible for the SE or the operation manager of the system to identify easily individual output variables that are output from respective PLCs constituting the PLC distributed control system.

(Other Variations)

The embodiments of the present invention are not limited to above modes, and variations as illustrated hereunder may be applied. The advantages of the present invention can be achieved by the variations or the modifications, based on the operation of the present invention.

(Variation 1)

For example, in above Embodiment 1, in the initial operation process of the safety communication, the output schedule definition frame is transmitted to the destination PLC to collate respective output schedule definition frames that have a correspondence relationship mutually. Conversely, the similar collating process may be executed by transmitting the reference schedule definition frame to the destination PLC. The similar advantages/effects can be achieved by conducting such transmission/reception.

(Variation 2)

Further, the number of PLCs connected mutually to build up the PLC distributed control system of the present invention may be set at will. Further, the number of the I/O modules connected to construct respective PLCs may be set freely. The communication network of the PLC distributed control system may be constructed by using a linear bus instead of the ring bus.

(Variation 3)

Further, in Embodiment 1, one communication line of the duplexed ring bus 14 is prepared for the backup in the abnormal operation, and is not used in the normal operation. However, there is no necessity that the network line should be restricted to the duplexed mode at the logical communication line level of the packet communication. The duplexing of communication may be implemented at the physical communication line level.

(Variation 4)

Further, as the expression mode of the diagram in the ladder diagram D2 in FIG. 11 of Embodiment 2, the display system in the text format may be employed.

Further, as the output schedule definition mode in FIG. 4 of Embodiment 1, the input system in the text format may be employed instead of GUI such as the check box matrix, or the like.

(Variation 5)

Further, the station address inputting means 220 in FIG. 11 of Embodiment 2 is provided as the means that causes the user to input the station address. In this case, in constructing the station address acquiring means of the present invention, the station address may be acquired automatically by using the diagnosis command, the query command, or the like.

INDUSTRIAL APPLICABILITY

The present invention is very useful in building up the PLC distributed control system using the safety PLC, nevertheless respective PLCs constituting the PLC distributed control system of the present invention are not always constructed by the safety PLCs. That is, the PLC distributed control system of the present invention can be constructed by using any PLCs each having the sequence program that simulates the ladder circuit.

FIG. 1:
(1) memory 22
(2) memory 34
(3) memory 57
(4) motor M

FIG. 2:
(1) station address "00"
(2) station address "01"
(3) station address "02".
(4) input contact
(5) coil (output variable)

FIG. 3A:
(1) (spare area) TBL13

FIG. 4:
(1) output schedule definition screen
(2) output variable address
(3) destination PLC station address
(4) cancel FIG. 5A:
(1) (spare area) TBL23

FIG. 6:
(1) station address "00"
(2) reference variable table producing program PGa FIG. 7:
(1) initial start
(2) transfer TBL1, TBLL2 between memories (S1) (FIG. 8)
(3) transmit each output schedule definition frame (station address 00—station addresses 01, 02) (S2)
(4) collate stored information with received information (station addresses 01, 02)(S3)
(5) decision of normal/abnormal (station addresses 01, 02) ? (S4)
(6) transmit each output schedule definition frame (station address 01→station addresses 00, 02) (S5)
(7), collate stored information with received information (station addresses 00, 02)(S6)
(8) decision of normal/abnormal (station addresses 01, 02) ? (S7)
(9) transmit each output schedule definition frame (station address 02→station addresses 00, 01) (S8)
(10) collate stored information with received information (station addresses 00, 01)(S9)
(11) decision of normal/abnormal (station addresses 01, 02) ? (S10)
(12) command to start the normal communication (S11)
(13) command to inhibit the normal communication (S12)
(14) normal
(15) abnormal FIG. 8:
(1) MP-A: microprocessor of an A system
(2) MP-B: microprocessor of a B system FIG. 9:
(1) length
(2) F: opening flag or closing flag
(3) DA: destination address (PLC station address)
(4) SA: sender address (PLC station address)
(5) FT: frame type
(6) L: data length
(7) I: information portion
(8) TEST: test bit
(9) FGS: frame check sequence FIG. 10A:
(1) transmitting process
(2) transmit OUTm (S24)
(3) safety stop (S25)

FIG. 10B:
(1) receiving process
(2) receive a packet addressed to the station (station address n)(S30)
(3) pick up an output variable OUTm with a station address m from the information portion I (S32)
(4) copy OUTm in areas that can be referred to from each input contact of the station (S36)

FIG. 11:
(1) object code D0
(2) station address inputting means 220
(3) input contact
(4) output contact

The invention claimed is:

1. A PLC distributed control system, comprising:
a plurality of PLCs each including a communicating unit, wherein each PLC of the plurality of PLCs includes,
a first storage unit that stores output schedule definition frames corresponding to other PLCs, wherein each output schedule definition frame corresponding to a respective other PLC is formed of output schedule definition information, which define, by respective bits, whether or not output variables that simulate output coils in a ladder diagram executed on the PLC are scheduled to be output to a respective other PLC, a second storage unit that stores reference schedule definition frames corresponding to the other PLCs, wherein each reference schedule definition frame corresponding to a respective other PLC is formed of reference schedule definition information, which define, by respective bits, whether or not output variables that simulate output coils in a ladder diagram executed on the respective other PLC are scheduled to refer to every output variable, a transmitter that transmits the output schedule definition frames or the reference schedule definition frames to other PLCs;

a receiver that receives other output schedule definition frames or other reference schedule definition frames from the other PLCs;

a collating unit that collates, bit by bit, the other output schedule definition frames or the other reference schedule definition frames received from the other PLCs with the output schedule definition frames and the reference schedule definition frames stored in the first and second storing units, on a corresponding frame basis for each respective other PLC, respectively, and a normal communication start deciding unit that decides whether or not a normal communication in the PLC distributed control system is started, based on a collated result by the collating unit, wherein the normal communication is inhibited in response to an inconsistency in at least one bit as a result generated by the collating unit.

2. The PLC distributed control system according to claim 1, wherein the transmitter includes a station address attaching unit that attaches a station address of the PLC to target transmission data to be transmitted, and wherein each of the PLCs further includes:
a definition information inputting unit that accepts an input of the output schedule definition information; and
a first frame producing unit that produces the output schedule definition frames on the first storage unit respectively, based on input information being input by the definition information inputting unit.

3. The PLC distributed control system according to claim 1, wherein each of the PLCs further includes:
a definition information extracting unit that extracts the reference schedule definition information from a source program of the ladder diagram that is executed on the PLC; and
a second frame producing unit that produces the reference schedule definition frames on the second storage respectively, based on extracted information extracted by the definition information extracting unit.

4. The PLC distributed control system according claim 1, wherein the transmitter has station address attaching unit for attaching a station address of the PLC to target transmission data to be transmitted, wherein each of PLCs further includes:
a diagram edition displaying unit that displays operation contents of the ladder diagram executed on the PLC on a predetermined screen or that causes the operation contents of the ladder diagram executed on the PLC to be output on a sheet of paper, and wherein the diagram edition displaying unit includes:
a station address acquiring unit that acquires a station address of the PLC in the PLC distributed control system; and
a display address code editing unit that rewrites address codes of output variables, which simulate output coils on an object program that embodies a ladder diagram, into logical address codes of a format containing the acquired station address.

* * * * *